United States Patent [19]

Trenkler

[11] Patent Number: 4,553,784
[45] Date of Patent: Nov. 19, 1985

[54] LINKAGE ARRANGEMENT FOR A CONVERTIBLE TOP

[75] Inventor: Werner Trenkler, Asperg, Fed. Rep. of Germany

[73] Assignee: Dr. Ing. h.c.F. Porsche AG, Fed. Rep. of Germany

[21] Appl. No.: 447,101

[22] Filed: Dec. 6, 1982

[30] Foreign Application Priority Data

Dec. 10, 1981 [DE] Fed. Rep. of Germany ....... 3148849

[51] Int. Cl.⁴ .............................................. B60J 7/12
[52] U.S. Cl. ...................................... 296/107; 296/122
[58] Field of Search ............... 296/107, 115, 114, 108, 296/110, 116, 117, 121, 122, 124

[56] References Cited

U.S. PATENT DOCUMENTS

| 2,833,593 | 5/1958 | Olivier | 296/107 |
| 3,236,557 | 2/1966 | Podolan | 296/107 |
| 3,405,970 | 10/1968 | Doka | 296/117 |
| 3,994,524 | 11/1976 | Lehmann | 296/116 |

FOREIGN PATENT DOCUMENTS

| 170651 | 7/1934 | Switzerland | 296/107 |
| 317248 | 8/1929 | United Kingdom | 296/107 |
| 415548 | 5/1934 | United Kingdom | 296/107 |

Primary Examiner—Robert B. Reeves
Assistant Examiner—Dennis H. Pedder
Attorney, Agent, or Firm—Craig and Burns

[57] ABSTRACT

A convertible top arrangement with a main roof column which is adapted to be displaced from a closed (up) position into an open (down) position by means of a linkage arrangement. In order for the main roof column to be moved into a position recessed within the vehicle body, the main roof column includes a lever section, on which is provided the pivot of the main roof column and a joint, whereby a first guide lever engages at the pivot and a second guide lever at the joint; both guide levers being supported at the body.

14 Claims, 1 Drawing Figure

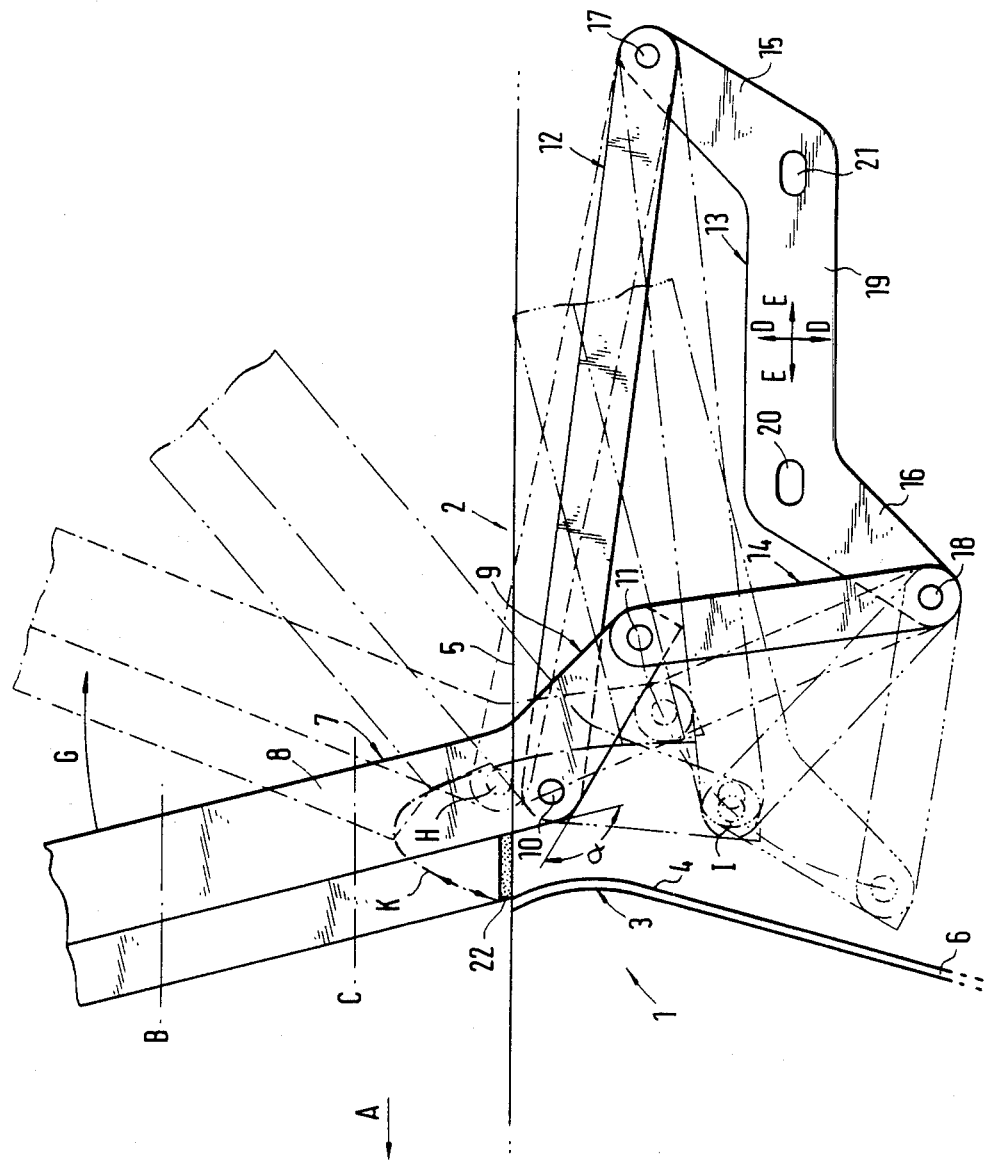

LINKAGE ARRANGEMENT FOR A CONVERTIBLE TOP

BACKGROUND OF THE INVENTION

The present invention relates to a linkage arrangement for a convertible top for passenger motor vehicles having a main roof column, which is adapted to be moved by means of the linkage arrangement between a closed (up) position and an open (down) position.

In a known top generally of the aforementioned type (German Patent 692,181), the pivot point of the main top column is fixedly mounted relative to the vehicle body. This construction entails the disadvantage with a predetermined body shape, the roof column cannot assume in the open (down) position of the top, a position completely recessed relative to the belt line of the vehicle body.

SUMMARY AND OBJECTS OF THE INVENTION

The aim of the present invention therefore resides in creating a linkage arrangement for a convertible top for a passenger motor vehicle, whose main roof column can be moved during opening of the top into a position recessed below the belt line and within the vehicle body by means of simple and functionally correct linkage means.

The underlying problems are solved according to the present invention where the main roof column includes a lever section on which is provided a pivot of the roof column and a joint and where a first guide lever engages at the pivot and a second guide lever at the joint and with both guide levers supported at the vehicle body.

The advantages principally achieved with the present invention reside in that by the pivotal connection of the main roof column, the latter is arranged completely recessed in the body when the top is open (down), as a result of which the other parts of the top assume a position where the visibility for the driver toward the rear is not impaired. Furthermore, the guide levers bring about that the main roof column is initially lifted during the opening of the top which assures a functionally correct lifting of the main roof column, for example, out of the door window seal. The guide levers and the lever section are parts which can be readily manufactured. The roof mounting support which is also simple due to its symmetrical construction, serves for the simplification of the installation of the top, i.e., the entire top can be preassembled outside of the vehicle and can be examined for its functioning ability. Furthermore, possibly occurring tolerances can be compensated for by the adjustable roof mounting support of the present invention.

These and other objects, features and advantages of the present invention will become more apparent from the following description when taken in connection with the accompanying drawing which shows, for purposes of illustration only, one embodiment in accordance with the present invention, and wherein:

BRIEF DESCRIPTION OF THE DRAWING

The single figure is a partial side elevational view of a passenger motor vehicle with a top having a linkage arrangement according to the present invention.

DETAILED DESCRIPTION OF THE PREFERRED EMBODIMENT

Referring now to the single figure of the drawing, of the passenger motor vehicle generally designated by reference numeral 1, only the part of a body generally designated by reference numeral 2 is shown which includes a door 3 and a side wall panel 4. The door 3 and the side wall 4 are delimited by a belt line 5. Additionally, a gap 6 extends between the door 3 and the side wall panel 4.

Of the top generally designated by reference numeral 7, a main roof column 8 is shown which is inclined in the driving direction A and more particularly in such a manner that the upper horizontal section B of the main roof column 8 is located further forwardly in the vehicle than the lower area C.

The main roof column 8 extends with a lever section generally designated by reference numeral 9 below the belt line 5; a pivot 10 for the main roof column 8 and a joint 11 are provided on the lever section 9. Additionally, the lever section 9 is angularly bent opposite the driving direction A (obtuse angle $\alpha$).

A first guide lever 12 engages at the pivot point 10 which is located adjacent the belt line 5—in the illustrated embodiment below the same. The first guide lever 12 extends generally in the vehicle longitudinal direction (horizontally or slightly inclined to a horizontal) and is rotatably retained at a roof mounting support 13. A second guide lever 14 engages at the joint point 11, whereby the second guide lever 14 extends generally in the upright direction (vertically or slightly inclined to a vertical) and is also pivotally supported at the roof mounting support 13.

The roof mounting support 13 is of one piece construction and includes angularly bent portions 15 and 16 having pivotal connections 17 and 18 for the guide levers 12 and 14. The portions 15 and 16 are arranged symmetrically to a base plate 19 of the roof mounting support 13 which is secured at the body 2 by means of threaded elements (not shown) which extend through the openings 20 and 21. The openings 20 and 21 are so dimensioned that the roof mounting support 13 is adjustable in the direction DD and EE.

If the main roof column 8 is displaced in the direction G for purposes of opening the top 7, then the pivot point 10 initially rises into the higher position H i.e, where pivot point 10, joint point 11 and pivotal connection 18 are all aligned. From there, the pivot point 10 is lowered until it reaches the position I. The main roof column 8 now assumes a position recessed in the body 2. During this described movement of pivot point 10, it should be noted that joint point 11 has moved from one side to the other side of a line connecting pivot point 10 and pivotal connection 18, generally in the driving direction A.

As a result of the initially upwardly directed movement of the pivot point 10, the main roof column 8 is lifted off a sealing element 22, for example, at the height of the belt line 5—indicated by the parabolically shaped line K—whereby a completely satisfactory functioning is assured. Of course, also a roof frame (not shown) of the top 7 is lifted in a similar manner from a door side window by this movement course.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A linkage arrangement for a convertible top for a passenger motor vehicle, the top having a main roof column, the arrangement comprising a plurality of lever means for operably displacing the main roof column between a first position associated with an up position of the top and a second position associated with a down position of the top, the main roof column including a lever section having pivot means and joint means for connection of the plurality of lever means, the plurality of lever means including a first guide lever means pivotally connected at one end to said pivot means and at a second end to a body of said vehicle and a second guide lever means pivotally connected at one end to said joint means and at a second end to the body of said vehicle, the second end of said first guide lever means being pivoted about a pivot axis fixed relative to the body of the vehicle, said first guide lever means being disposed generally horizontally and said second guide lever means being disposed generally vertically when said top is in the up position, said joint means moving from one side of an imaginary line connecting the pivot means and the point at which the second end of the second guide lever means is pivotally connected to the body of the vehicle to an opposite side of the imaginary line when the main roof column is displaced from said first position to said second position, said plurality of lever means controlling movement of said main roof column, when said main roof column is displaced from said first position to said second position, including moving the main roof column initially upwardly and subsequently downwardly such that said main roof column is recessed within said vehicle body.

2. An arrangement according to claim 1, wherein the first and second guide lever means are supported at the body of the vehicle by a mounting support.

3. An arrangement according to claim 2, wherein the mounting support is adjustably retained at the body.

4. An arrangement according to claim 2 wherein the lever section is angularly bent opposite the driving direction of the vehicle.

5. An arrangement according to claim 4, wherein the pivot means is located in proximity to a belt line of the vehicle.

6. An arrangement according to claim 4, wherein the pivot means is located below said belt line.

7. An arrangement according to claim 2, wherein the mounting support includes angularly bent areas with pivotal connections for each of the first and second guide lever means, said areas being arranged substantially symmetrically to a base plate of the mounting support.

8. An arrangement according to claim 7, wherein the angularly bent areas and the base plate are integrally formed.

9. An arrangement according to claim 8, wherein the mounting support means is adjustably retained at the body.

10. An arrangement according to claim 9, wherein the lever section is angularly bent opposite the driving direction of the vehicle.

11. An arrangement according to claim 10, wherein the pivot means is located in proximity of a belt line of the vehicle.

12. An arrangement according to claim 10, wherein said pivot means is located below said belt line.

13. An arrangement according to claim 1, wherein the lever section is angularly bent opposite the driving direction of the vehicle.

14. An arrangement according to claim 13, wherein the pivot means is located in proximity of a belt line of the vehicle.

* * * * *